(12) United States Patent
Momosaki (10) Patent No.: US 7,380,624 B2
(45) Date of Patent: Jun. 3, 2008

(54) AIR INTAKE STRUCTURE FOR MOTORCYCLE

(75) Inventor: Makoto Momosaki, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 203 days.

(21) Appl. No.: 10/921,140

(22) Filed: Aug. 19, 2004

(65) Prior Publication Data

US 2005/0051375 A1    Mar. 10, 2005

(30) Foreign Application Priority Data

Sep. 9, 2003    (JP) .............................. 2003-317175

(51) Int. Cl.
*B62M 7/00*    (2006.01)
(52) U.S. Cl. .................................... 180/68.3
(58) Field of Classification Search ................ 180/219, 180/229, 68.1, 68.2, 68.3
See application file for complete search history.

(56) References Cited

U.S. PATENT DOCUMENTS

| | | | |
|---|---|---|---|
| 4,995,447 A * | 2/1991 | Weidmann et al. | 165/44 |
| 5,012,883 A * | 5/1991 | Hiramatsu | 180/225 |
| 5,513,893 A * | 5/1996 | Nakata et al. | 296/180.1 |
| 6,276,482 B1 * | 8/2001 | Moriya et al. | 180/229 |
| 6,409,783 B1 * | 6/2002 | Miyajima et al. | 55/385.3 |
| 6,422,332 B1 * | 7/2002 | Takata et al. | 180/68.3 |
| 6,695,088 B2 * | 2/2004 | Schroeder | 180/229 |
| 6,808,552 B2 * | 10/2004 | Borla | 95/273 |

FOREIGN PATENT DOCUMENTS

| | | |
|---|---|---|
| EP | 1 083 330 A2 | 3/2001 |
| EP | 1 087 127 A2 | 3/2001 |
| JP | 59 137216 A | 8/1984 |
| JP | A 2001-152990 | 6/2001 |

* cited by examiner

*Primary Examiner*—Frank B Vanaman
(74) *Attorney, Agent, or Firm*—Oliff & Berridge, PLC (57) ABSTRACT

An air intake structure in a motorcycle having a body frame including a hollow head member in its front wall with an air inlet opening and supporting a steering shaft and paired hollow main frame members extending rearward from the head member on right and left sides of the motorcycle. The structure includes an air cleaner disposed behind the head member, an inlet duct having an open front end and an open rear end, an intake duct in the hollow main frame member, respectively having a front part extended toward the head member in the hollow main frame member and having an open front end, and a rear part connected to the air cleaner. An air passage defined by the intake duct has a sectional area increased downstream with respect to the direction of air flow. The intake ducts are internally provided with straightening plate, respectively.

7 Claims, 8 Drawing Sheets

AIR INTAKE STRUCTURE FOR MOTORCYCLE

BACKGROUND OF THE INVENTION

1. Field of the Invention

The present invention relates to an air intake structure of a motorcycle, more particulary to the air intake structure for carrying air from an air intake member to an air cleaner of an engine in a motorcycle.

2. Description of the Related Art

A generally known air intake structure of the engine for a motorcycle has an air intake member disposed at the front end of a body of a motorcycle with its intake opening forward to take in incoming air efficiently and an intake duct for carrying air taken in through the air intake member to an air cleaner. A part of the body frame is used as an intake air passage to reduce the necessary length of the intake duct and space for containing the intake duct.

Figure 7:
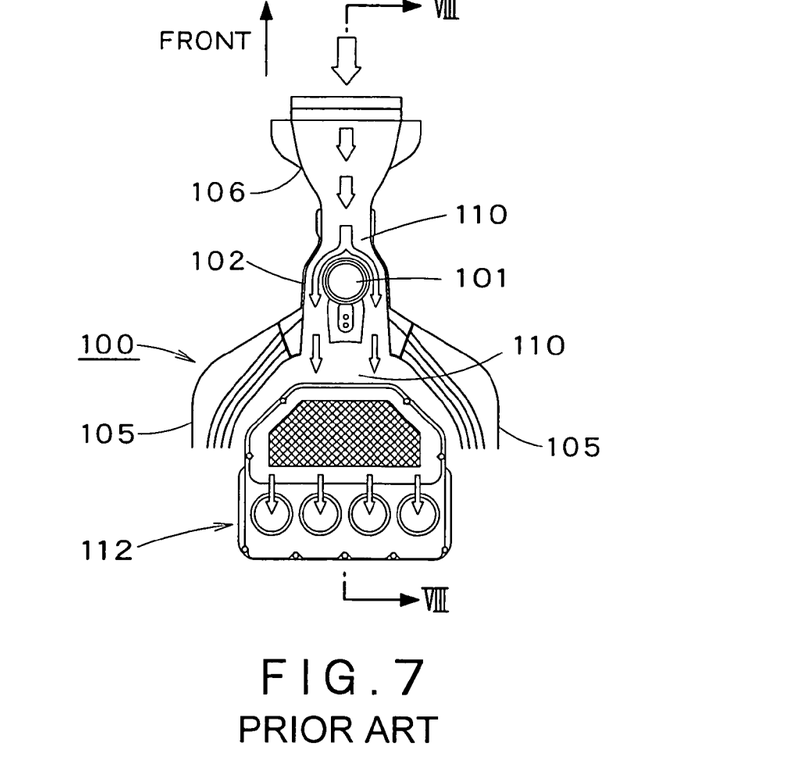
FIG. 7 is a schematic plan view of conventional air intake structure.
Figure 8:
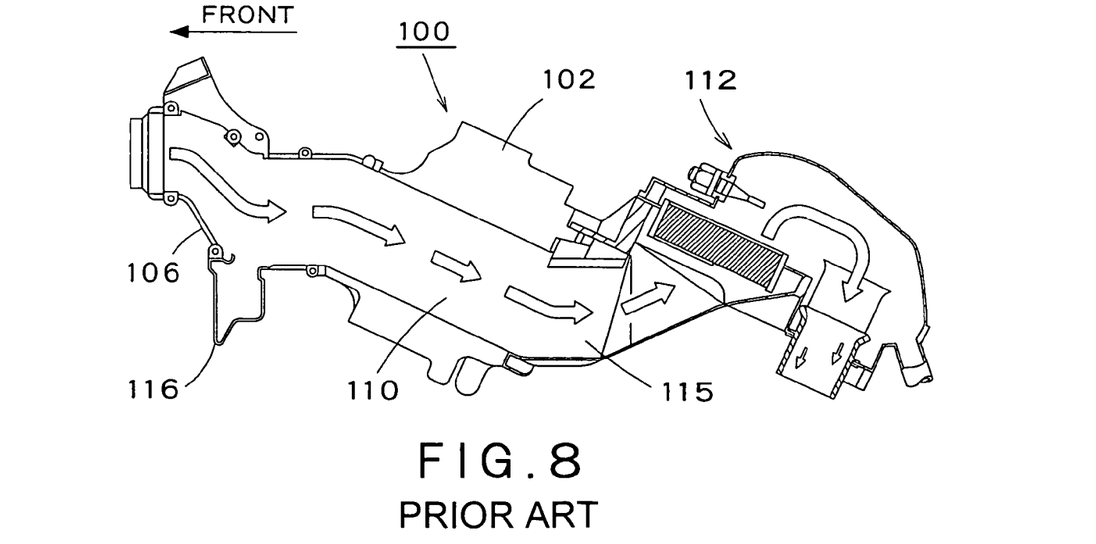
FIG. 8 is an enlarged sectional view taken on the line VIII-VIII in FIG. 7.

FIG. 7 is a sectional view in a horizontal plane of a conventional air intake structure and FIG. 8 is an enlarged sectional view taken on the line VIII-VIII in FIG. 7.

Referring to FIG. 7, a body frame 100 of the motorcycle has a hollow head member 102 housing a head pipe 101, and right and left main frame members 105 extending backward from the head member 102 on the right and the left side, respectively, of the body frame 100. The open front end of an air intake duct 106 is connected to the front end of the head member 102. The head member 102 defines a substantially straight, longitudinal intake passage 110.

Referring to FIG. 8, a part of the head member 102 corresponding to the rear end of the intake passage 110 is connected to an inlet duct 115 connected to an air cleaner 112. A resonator 116 for intake noise suppression is connected to the air intake duct 106 so as to project downward from the air intake duct 106. Air taken in through the open front end of the air intake duct 106 flows through the intake passage 110 in the head member 102. The air devides into right and left sides at the head pipe 101 and flows into the air cleaner 112. The air passage between the air intake duct 106 and the air cleaner 112 is substantially straight.

Figure 9:
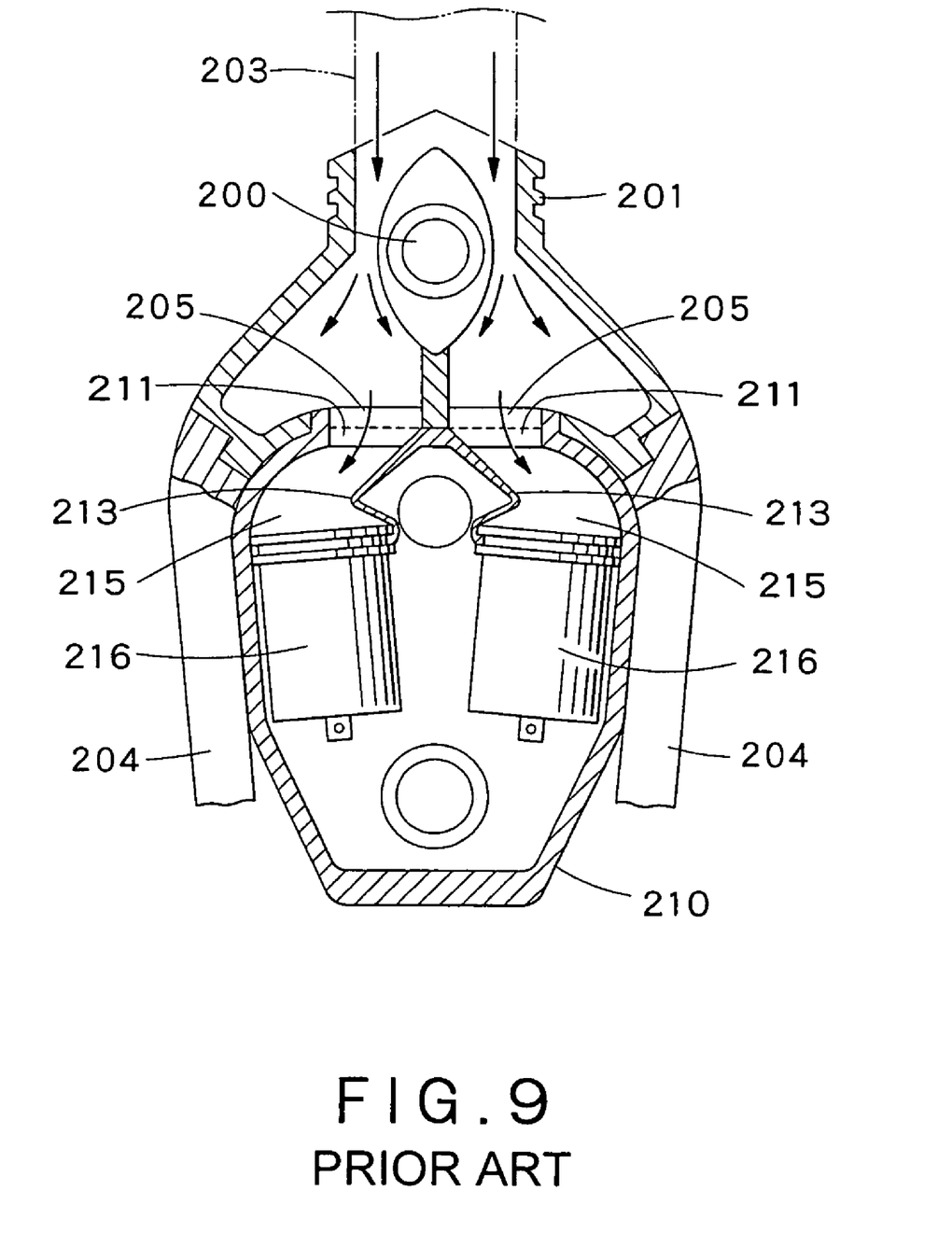
FIG. 9 is a longitudinal sectional view of another conventional air intake structure.

Referring to FIG. 9 showing another conventional air intake structure disclosed in JP-A No. 2001-152990, a body frame has a Y-shaped head box 201 housing a head pipe 200. An air intake duct 203 is joined to the front end of the head box 201. Right and left outlet openings 205 are formed in the back wall of the head box 201. An front openings 211 of an air cleaner case 210 is connected to the outlet openings 205. A water drip plate 213 having the shape of an inverted V is disposed inside the air cleaner case 210 so as to confront the openings 205 and define right and left intake passages 215 connected to right and left air cleaner elements 216.

In the air intake structures shown in FIGS. 7 and 8, since air taken into the air intake duct 106 flows through the substantially straight intake passage 110, the resonator 116 is provided to be connected to the air intake duct 106 so as to project downward from the air intake duct 106 for intake noise suppression. Therefore, the motorcycle needs to provide a space for installing the resonator 116 therein and there is a limit to the volume of the resonator 116. Further water, such as rainwater, leaked into the air intake duct 106 is carried by air flowing at a high velocity into the air cleaner 112. Therefore, the inlet of the air cleaner 112 is opened downward as shown in FIG. 8, and an additional dehydrating mechanism may be necessary on the upstream side of the inlet of the air cleaner 112. Thus, additional work is required for preventing the leakage of water into the air intake structure.

The air intake structure shown in FIG. 9 has the Y-shaped head box 201 defining an air passage sharply expanded toward the main frame members 204 such that the sectional area of the air passage increases rearward to suppress intake noise. In this air intake structure, all the air taken in through the air intake duct 203 flows into the wide Y-shaped part of the air passage and the flow velocity of the air drops sharply, and then the air flows through the right and left outlet openings 205 into the intake passages 215 of the air cleaner 210. Therefore, a satisfactory intake noise suppressing effect is low, and the large drop of the flow velocity of the air reduces intake efficiency. The water drip plate 213 having the shape of an inverted V is disposed inside the air cleaner case 210 to prevent the leakage of water into the air cleaner case 210. Therefore, the volume of a space on the clean side in the air cleaner case 210 is small. It is difficult to prevent the leakage of water into the cleaner case 210 effectively only by the water drip plate 213.

SUMMARY OF THE INVENTION

In such a condition, it is an object of the present invention to provide an air intake structure capable of effectively preventing the leakage of water into an air cleaner, and suppressing an intake noise with a compact structure.

An air intake structure according to the present invention for a motorcycle having a body frame including a hollow head member provided in its front wall with an air inlet opening and supporting a steering shaft having an upper end holding a handlebar, and paired, hollow right and left main frame members extending rearward from the head member on right and left sides of the motorcycle, respectively, includes: an air cleaner disposed behind the head member; an inlet duct having an open front end opening forward, and an open rear end connected to the air inlet opening of the head member; an intake duct inserted in the hollow main frame member, having a front part extended toward the head member in the hollow main frame member and having an open front end, and a rear part connected to the air cleaner.

In the above structure, since air taken in through the inlet duct flows through the head member into the main frame member having a large hollow space and, the flow velocity of the air decreases in the main frame member. Consequently, water contained in the air separates from the air and drops in the main frame member. Thus, the air intake structure has an improved dehydrating ability.

Since the hollow space of the main frame member serves as a resonator of the intake structure, intake noise can be suppressed. Further, the large hollow space of the main frame member have a high intake noise suppressing effect.

Since the intake duct connected to the air cleaner is inserted in the main frame members so as to extend toward the head member, the air flows at a high flow velocity through the intake ducts in the main frame member. Thus, the air flows at a high flow velocity into the air cleaner. Even though the flow velocity of the air decreases temporarily in the main frame members, the air flows at a high velocity into the air cleaner, so that intake efficiency is not reduced and hence the engine of the motorcycle is able to exercise its desired performance.

The insertion of the intake ducts connected to the air cleaner in the main frame members improves the dehydrating effect of the air intake structure.

Preferably, the number of the intake duct may be two, one of the two intake ducts may be inserted in the right main frame member, and the other intake duct may be inserted in the left main frame member.

In this structure, spaces in the main frame members can be effectively used for installing the intake ducts, and the right and the left intake ducts assure a high flow velocity and provide the air passages of a large cross sectional area.

Preferably, an air passage defined by the intake duct may have a cross, sectional area increased downstream with respect to the direction of air flow.

In this structure, the dehydrating effect of the air intake structure is further enhanced.

Preferably, the intake duct may have bend bending in a horizontal plane.

In this structure, the dehydrating effect of the air intake structure is further enhanced.

Preferably, the intake duct may be internally provided with straightening plate for fairing air flow inside the intake duct.

In this structure, the straightening plate in the intake duct promotes dehydration in the intake duct and prevent the turbulent flow of the air in the intake duct.

Preferably, the air cleaner may have an air cleaner box containing a forward convex V-shaped air cleaner element.

In this structure, the forward convex air cleaner element increases the volume of a clean-side space in the air cleaner box and has an increased filtering area. Thus, the air cleaner has an improved air-cleaning function and an improved intake noise suppressing function with compact construction.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Motorcycle

Figure 1:
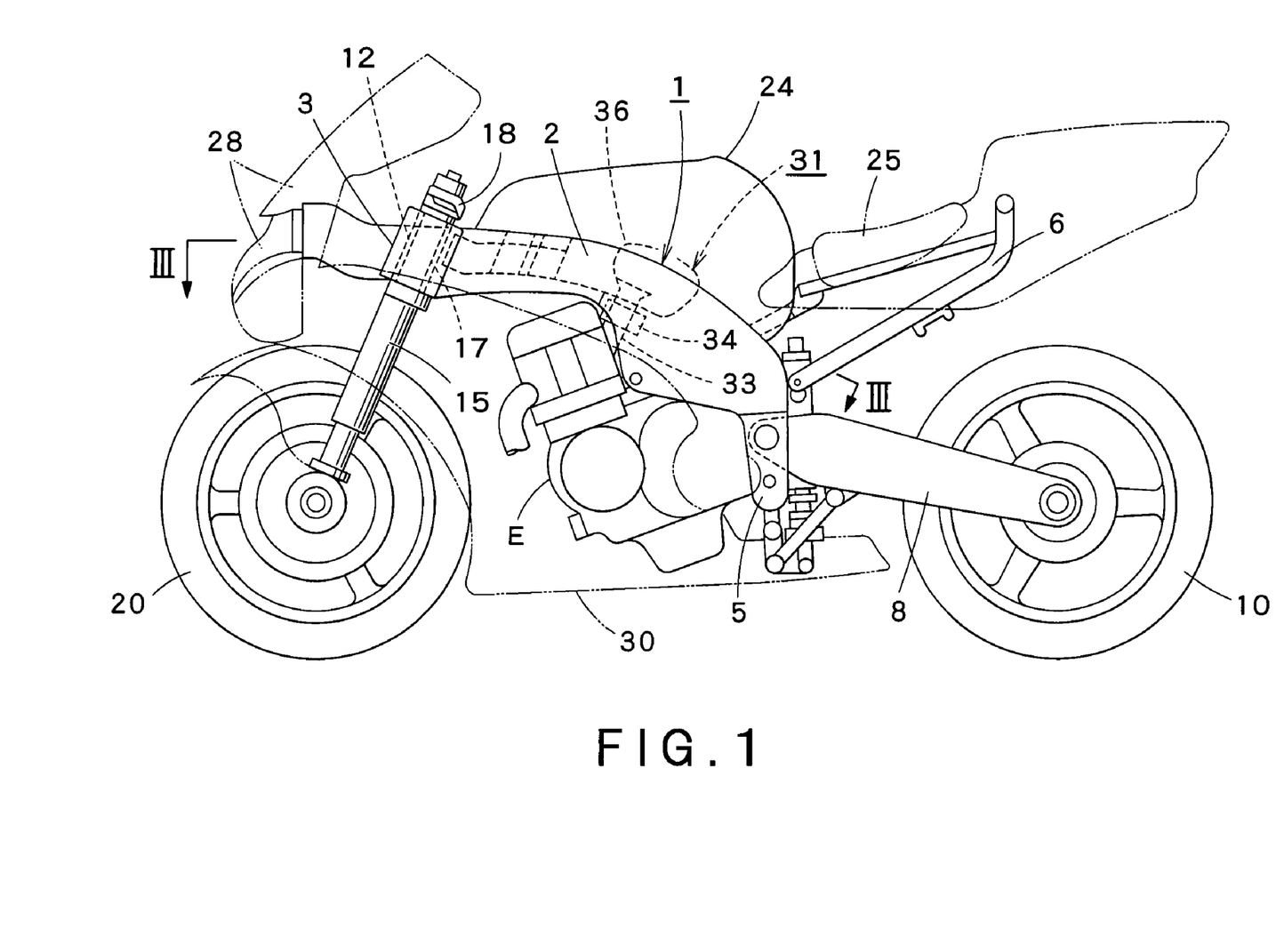
FIG. 1 is a side elevation of a motorcycle provided with an air intake structure in a preferred embodiment according to the present invention taken from the left side of the motorcycle.

Referring to FIG. 1 showing a motorcycle provided with an air intake structure in a preferred embodiment according to the present invention, a body frame 1 has paired right and left main frame members 2, a head member 3 joined to the front ends of the main frame members 2, lower brackets 5 attached to the lower rear ends of the main frame members 2, and a rear frame 6. A swing arm 8 is supported swingably in a vertical plane on the lower brackets 5. A rear wheel 10 is supported on rear end part of the swing arm 8. A rear suspension, not shown, is provided between the swing arm 8 and the body frame to support the body frame elastically on the rear wheel 10.

Figure 3:
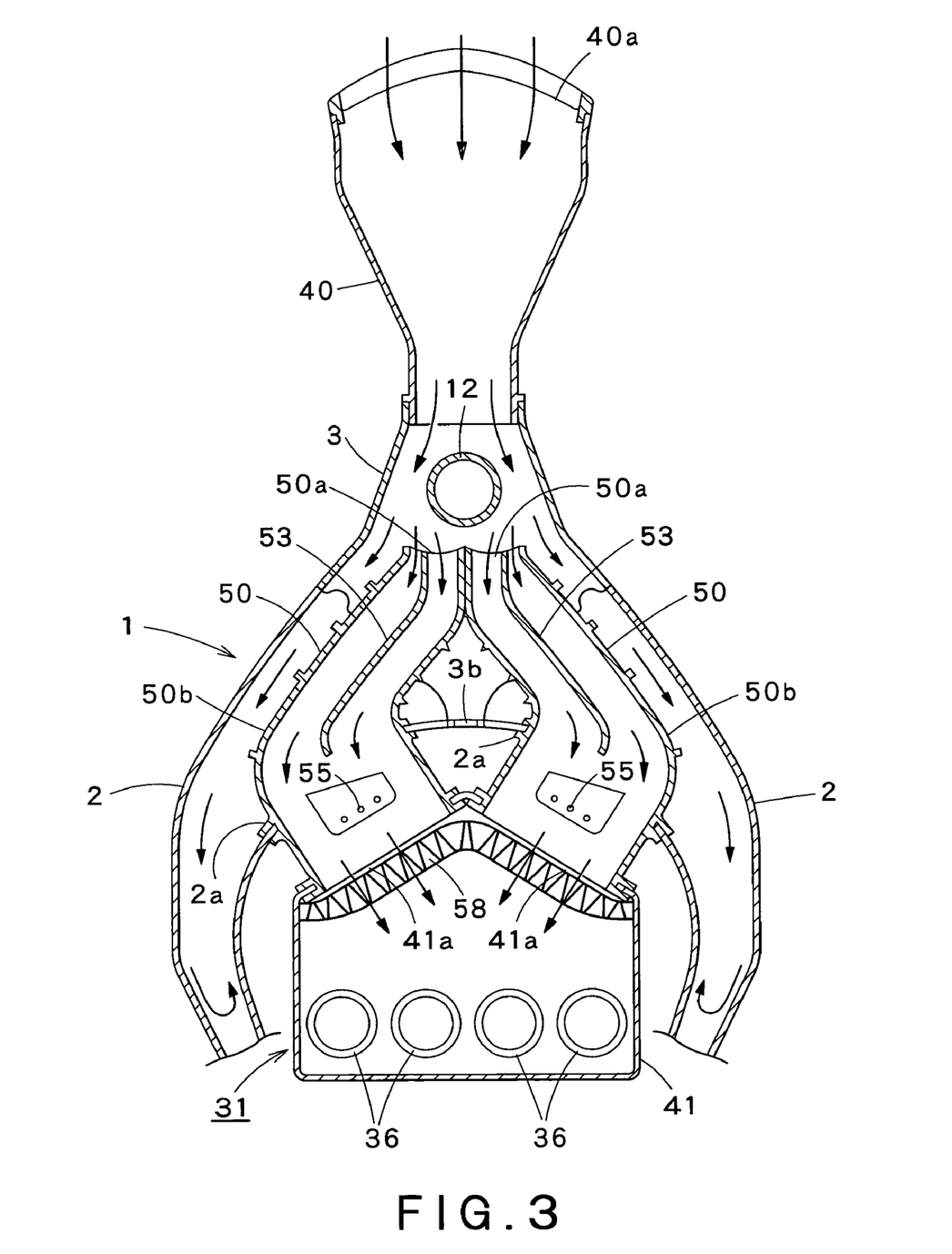
FIG. 3 is a sectional view taken on the line III-III in FIG. 1.

A head pipe 12 is housed in the head member 3 of the body frames (see FIG. 3). A steering shaft 17 is supported for turning in the head pipe 12. A front fork 15 is connected to the lower end of the steering shaft 17, and a handlebar 18 is fastened to the upper end of the steering shaft 17. A front wheel 20 is supported on a lower end part of the front fork 15. A fuel tank 24 is mounted on the main frame 2. A seat 25 is mounted on the rear frame 6. A front cowl 28 is attached to the front end of the body frame 1, and side cowls 30 are attached to the right and the left side of the main frame 1.

The motorcycle is provided with an engine E, such as an inline four-cylinder engine. The engine E is disposed under the main frame members 2 and is supported on the lower brackets 5 and the main frames 2. An air cleaner 31 is disposed between the engine E and the fuel tank 24 disposed above the engine. Intake pipes 33 are connected to the inlet ports of the cylinders of the engine E, respectively, and to a carburetor 34 connected to air exits 36 formed in a rear part of the air cleaner 31.

Figure 2:
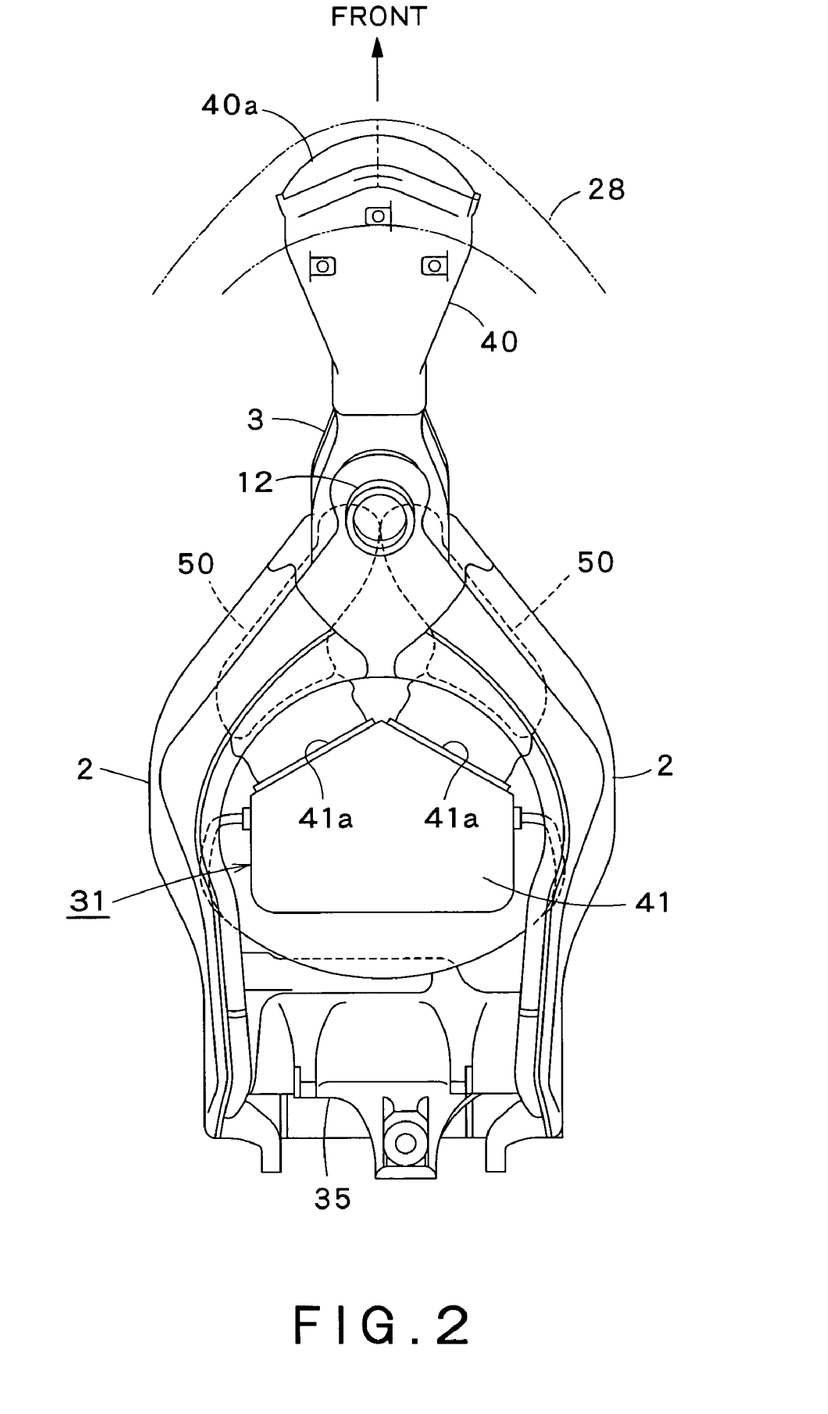
FIG. 2 is a plan view of main frame members and an air cleaner.

Referring to FIGS. 2, the right and the left main frame members 2 are hollow and branch off from the head member 3 to the right and the left, respectively, and extend rearward. The right and the left main frame members 2 have closed rear ends and open front ends connected to the head member 3. Thus, each of the right and the left main frame member 2 defines a closed space of a large volume. A cross member 35 is joined to the respective rear ends of the right and the left main frame members 2.

Air Intake Structure

An air inlet duct 40 is connected to the front end of the head member 3 so as to extend forward. The air inlet duct 40 has a flared front part fitted in an opening formed in the front cowl 28 and having a front air inlet 40a through which air flows into the air inlet duct 40.

Figure 5:
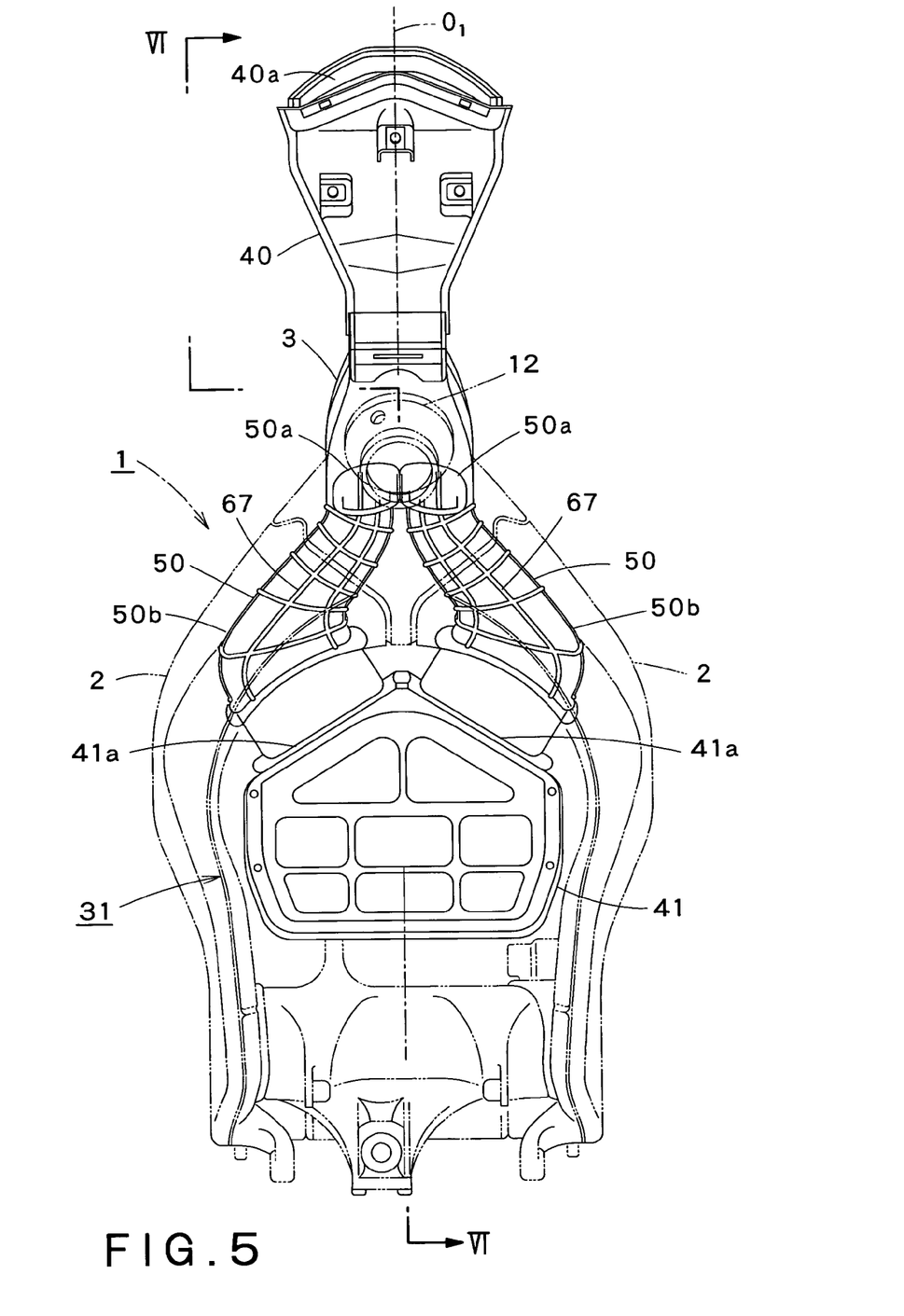
FIG. 5 is a plan view of the air cleaner, an inlet duct and intake ducts in the preferred embodiment.

Referring to FIG. 5, the air cleaner 31 has an air cleaner case 41 having a forward convex V-shaped front wall provided with air inlet openings 41a formed symmetrically with respect to the longitudinal axis $O_1$ of the motorcycle. The rear ends of paired right and left intake ducts 50 are connected to the air inlet openings 41a of the air cleaner, respectively. The right and the left intake ducts 50 are disposed symmetrically with respect to the longitudinal axis $O_1$ of the motorcycle. The intake ducts 50 are formed of rubber or a plastic material. The right and the left intake ducts 50 are inserted in the right and the left main frame members 2, such that front ends 50a thereof are positioned near the head pipe 12. The front ends 50a of the right and the left intake duct 50 open toward the front in the head member 3.

Referring to FIG. 3, the head member 3 is hollow and has an open front end connected to the air inlet duct 40. A rear part of the head member 3 is divided into right and left parts by a middle wall 3b to have open rear ends. The open rear ends of the right and the left rear parts of the head member 3 are joined to the open front ends of the right and the left main frame members 2, respectively. The intake ducts 50 are inserted in the main frame members 2 through openings 2a formed in the inner side walls of the main frame members 2, respectively, and extend near to the head pipe 12 in the head member 3. The sectional area of an intake passage defined by each of the intake ducts 50 increases downstream (rearward).

Figure 6:
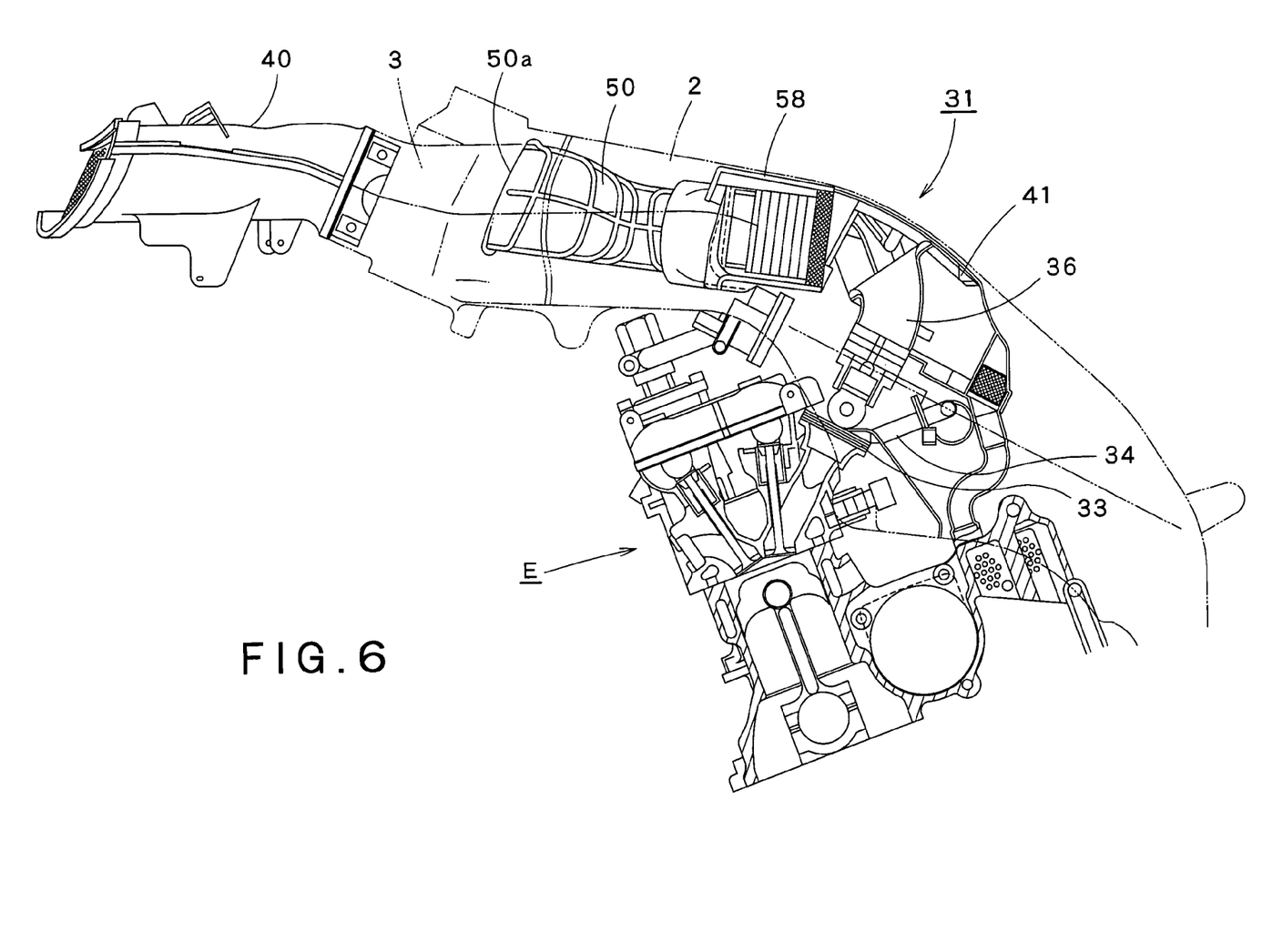
FIG. 6 is an enlarged sectional view taken on the line VI-VI in FIG. 5.

The open front ends 50*a* of the intake ducts 50 are contiguous with each other and are positioned near the head pipe 12. The open front ends 50*a* have a substantially vertically elongate rectangular shape as shown in FIG. 6. The intake ducts 50 extend outwardly obliquely rearward along the right and the left main frame members 2, respectively, so as to separate gradually from each other. The intake ducts 50 have bends 50*b*, respectively. Rear parts of the intake ducts 50 extend inwardly obliquely rearward from the bends 50*b* so as to approach gradually each other. The rear parts of the intake ducts 50 extend outside the main frame through the openings 2*a* of the main frame members 2, and the rear ends of the intake ducts 2 are connected to the air inlet openings 41*a* of the air cleaner case 41, respectively. A straightening plate 53 for fairing air flow within the intake duct 50 is formed integrally with front part of the intake duct 50 so as to extend between the open front end 50*a* and the bend 50*b* of the intake duct 50. The straightening plate 53 divides the interior of the intake duct 50 into right and left parts to have substantially equal cross sectional area. Small drain hole 55 is formed in part, extending outside the main frame member 2, of the bottom wall of the rear part of the intake duct 50 extending rearward from the bend 50*b*.

An air cleaner element 58 having a forward convex V-shape conforming to the shape of the V-shaped front wall provided with the air inlet openings 41*a* is placed in the air cleaner case 41.

Figure 4:
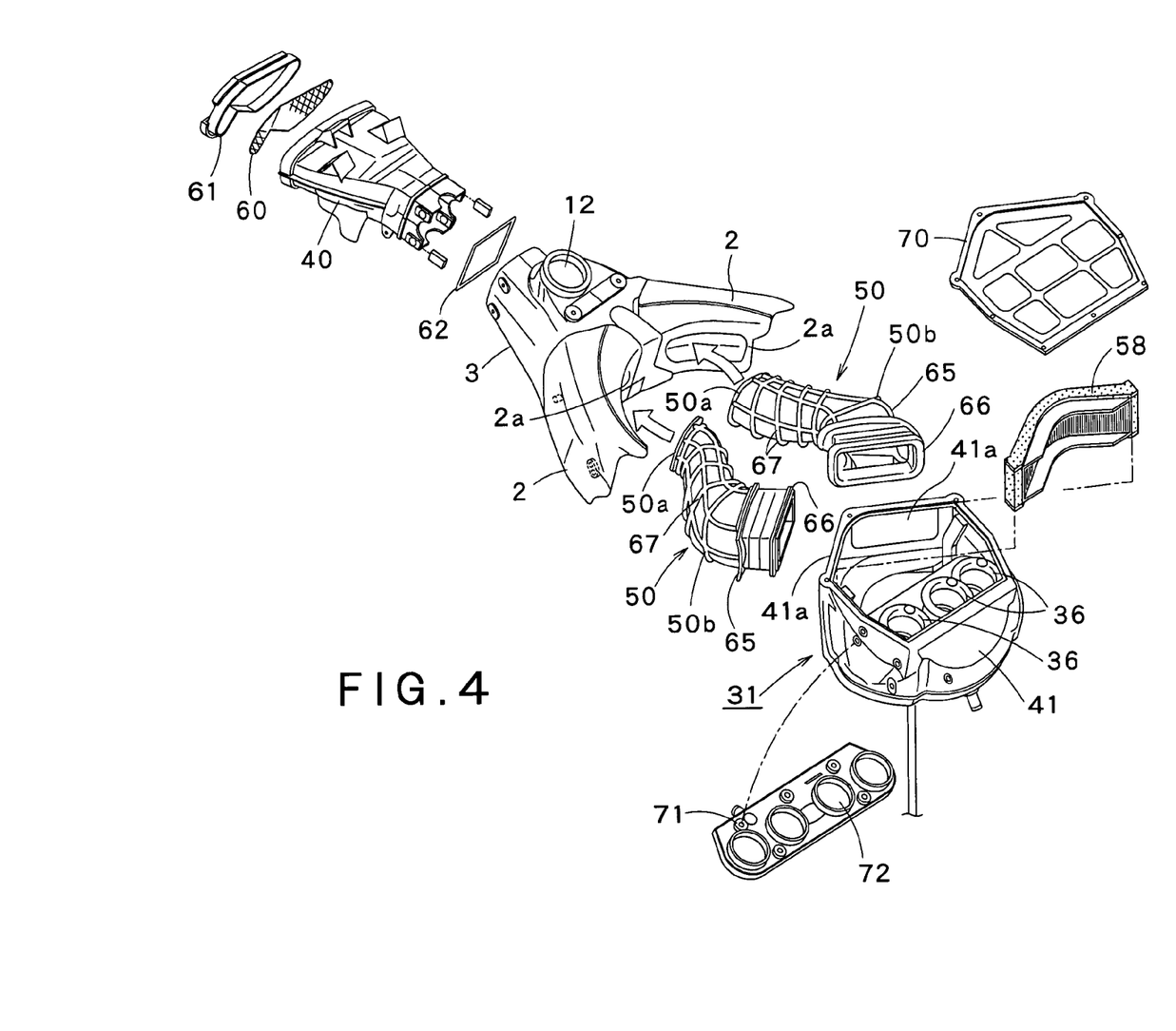
FIG. 4 is an exploded perspective view of the air intake structure in the preferred embodiment.

Referring to FIG. 4 showing the air intake structure in an exploded perspective view, tubular outlet members 36 are formed on to a rear part of the bottom wall of the air cleaner case 41 so as to project into the air cleaner case 41. The outlet members 36 are formed in different lengths, respectively, to adjust intake passage lengths. For example, the two middle air outlet members 36 are longer than the rest. The two middle outlet members 36 may be bent forward so as to open forward as shown in FIG. 6.

Referring again to FIG. 4, a dust net 60 is fastened to the front end of the air inlet duct 40 by a holding frame 61 so as to cover the front air inlet 40*a*. A packing 62 is held between the air inlet duct 40 and the front end of the head member 3. The intake ducts 50 are provided in its outer surfaces with grooves 65 for receiving the edges of the openings 2*a* of the main frame members 2, and grooves 66 for receiving the edges of the air inlet openings 41*a* of the air cleaner case 41, respectively. Reinforcing ribs 67 are formed on the outer surfaces of the intake ducts 50 to maintain their shapes. An upper cover 70 and a lower cover 71 are attached to the upper and the lower end of the air cleaner case 41, respectively. The lower cover 71 is provided with connecting holes 72 to which the intake pipes 33 are connected through the carburetor 34.

Referring to FIG. 3, air (running wind) introduced through the front air inlet 40*a* into the air inlet duct 40 with ram pressure (dynamic pressure) is divided in right and left sides of the head pipe at the head pipe 12 and flows into the right and the left main frame members 2 and part of the air flows into the intake ducts 50. The flow velocity of the air decreases in the main frame members 2 each having a large volume. Consequently, water contained in the air separates from the air and drops in drops in the main frame members 2. The main frame members 2 serve also as a resonator to reduce intake noise. Part of the air flowed into the intake ducts 50 flows at a high flow velocity through the intake ducts 50 into the air cleaner 31. Therefore, the intake efficiency of the engine E is not reduced and hence the engine E is able to exercise its desired performance.

As the air flows at a high flow velocity through the intake ducts 50, the straightening plates 53 extending obliquely rearward so as to separate from the longitudinal axis $O_1$ of the motorcycle toward the rear prevent the turbulent flow of the air in front parts of the intake ducts 50 to improve intake efficiency. Water contained in the air collides against the straightening plates 53 and is separated from the air and, consequently, the air is dehydrated again. Further water carried by the air flowing at a high flow velocity collides against the bends 50*b* of the intake ducts 50 and is separated from the air to dehydrate the air. Since the intake ducts 50 are formed such that the sectional area of the air passage defined by each of the intake ducts 50 is increased downstream with respect to the direction of air flow, the flow velocity of the air decreases slightly in the rear parts of the intake ducts 50, which promotes the separation of water from the air.

Then, the air flows from the intake ducts 50 through the air inlet openings 41*a* formed in the front wall of the air cleaner case 41 and the air cleaner element 58. The air cleaned by the air cleaner element 58 flows into the space on the clean side of the air cleaner case 41. Since the front wall of the air cleaner case 41 and the air cleaner element 58 have the forward convex V-shapes, respectively, the space on the clean side of the air cleaner case can be formed in a large volume. The air flows from the space on the clean side of the air cleaner case 41 through the outlet members 36 into the air intake pipes 33 shown in FIG. 1.

Water separated from the intake air in the intake ducts 50 is drained through the drain holes 55 formed in the bottom walls of the intake ducts 50. Water separated from the intake air in the main frame members 2 is drained through drain holes, not shown, formed in rear end parts of the main frame members 2.

In an air intake structure in a modification of the foregoing air intake structure of the present invention, the head member may be connected to the air cleaner by a single intake duct extended from the air cleaner toward the head member in the main frame instead of by the paired right and the left intake ducts. The single intake duct can be used in combination with the air cleaner case 41 having the forward convex V-shaped front wall provided with the air inlet openings 41*a*, and the forward convex V-shaped air cleaner element 58. In this case, the forward convex V-shaped air filter element 58 has a large filtering area and is effective in forming the space on the clean side in a large volume.

Although the invention has been described in its preferred embodiment with a certain degree of particularity, obviously many changes and variations are possible therein. It is to be understood that the present invention may be practiced otherwise than as specifically described herein without departing from the scope and spirit thereof.

What is claimed is:

1. An air intake structure for a motorcycle having a body frame including a hollow head member provided in a front wall of the body frame, the hollow head member being provided with an air inlet opening, and a head pipe located in a center of the hollow head member for supporting a steering shaft, the body frame further including paired, right and left hollow main frame members extending rearward from the hollow head member on right and left sides, respectively, of the motorcycle, the air intake structure comprising:

an air cleaner disposed behind the hollow head member;

an inlet duct having an open front end that opens forward, and an open rear end that connects to the air inlet opening of the head member; and an intake duct inserted within the hollow main frame members, wherein the intake duct has a front part, a front end and a rear part, wherein the front part extends toward the head pipe but not forwardly thereof and into both of the hollow main frame members and the hollow head member, wherein the intake duct has the front end with an opening that opens near the head pipe so as to communicate with an air intake path formed at both sides of the head pipe, wherein the rear part extends outside of the body frame and connects to an air inlet opening of the air cleaner disposed outside of the body frame.

2. The air intake structure according to claim 1, wherein the number of the intake duct is two, one of the two intake ducts is inserted in the right main frame member, and the other intake duct is inserted in the left main frame member.

3. The air intake structure according to claim 2, wherein an air passage defined by each of the intake ducts has a cross sectional area increased downstream with respect to the direction of air flow.

4. The air intake structure according to claim 2, wherein the intake ducts have bends bending in a horizontal plane, the bends being included within the body frame, and wherein the intake ducts extend outwardly obliquely rearward along the right and the left main frame members, respectively, and rear parts of the intake ducts extend inwardly obliquely rearward from the bends to the air inlet openings of the air cleaner in the horizontal plane.

5. The air intake structure according to claim 4, wherein the intake ducts are internally provided with straightening plates for fairing air flow inside the intake ducts, and the straightening plates extend along the intake ducts from the open front ends of the intake ducts to near the bends in the horizontal plane.

6. The air intake structure according to claim 4, wherein the air cleaner has an air cleaner box containing a forward convex V-shaped air cleaner element, the air cleaner element being provided with the air inlet openings of the air cleaner.

7. The air intake structure according to claim 1, wherein the intake duct is separate and distinct from the hollow main frame member and the hollow head member.

* * * * *